(12) United States Patent
Lombas

(10) Patent No.: US 8,658,045 B1
(45) Date of Patent: Feb. 25, 2014

(54) OIL SPILL RECOVERY VESSEL AND METHOD THEREFORE

(76) Inventor: Leslie Lombas, Mandeville, LA (US)

(*) Notice: Subject to any disclaimer, the term of this patent is extended or adjusted under 35 U.S.C. 154(b) by 742 days.

(21) Appl. No.: 12/882,197

(22) Filed: Sep. 14, 2010

Related U.S. Application Data

(60) Provisional application No. 61/241,992, filed on Sep. 14, 2009.

(51) Int. Cl.
C02F 1/00 (2006.01)
E02B 15/04 (2006.01)

(52) U.S. Cl.
USPC ............ 210/747.6; 210/744; 210/747.5; 210/776; 210/242.3; 210/923

(58) Field of Classification Search
USPC ........... 210/7, 44, 242.3, 923, 257.1, 170.09, 210/170.1, 170.11, 177.18, 747.6, 744, 210/747.5, 776
See application file for complete search history.

(56) References Cited

U.S. PATENT DOCUMENTS

| | | | |
|---|---|---|---|
| 2,890,672 A * | 6/1959 | Boericke, Jr. .................. 114/274 |
| 3,237,774 A | 3/1966 | Schuback |
| 3,708,070 A | 1/1973 | Bell |
| 3,754,653 A | 8/1973 | Verdin |
| 3,822,789 A | 7/1974 | Crisafulli |
| 3,860,519 A | 1/1975 | Weatherford |
| 3,966,615 A | 6/1976 | Petchul et al. |
| 4,054,525 A | 10/1977 | Propp |
| 4,426,288 A | 1/1984 | Munte |
| 4,511,470 A | 4/1985 | Ayroldi |
| 4,554,070 A | 11/1985 | Jordon |
| 4,795,567 A | 1/1989 | Simpson et al. |
| 5,019,277 A * | 5/1991 | Andelin ............... 210/776 |
| 5,022,987 A | 6/1991 | Wells |
| 5,043,065 A | 8/1991 | Propp |
| 5,047,156 A | 9/1991 | Sullivan |
| 5,102,540 A * | 4/1992 | Conradi et al. .......... 210/232 |
| 5,149,443 A * | 9/1992 | Varnam ............... 210/739 |
| 5,158,673 A | 10/1992 | Halter |
| 5,194,164 A | 3/1993 | Adams |
| 5,295,453 A * | 3/1994 | Inoue .................. 114/274 |
| 5,308,510 A | 5/1994 | Gore |
| 5,478,483 A | 12/1995 | Gore |
| 5,491,922 A * | 2/1996 | Sanders ................ 43/6.5 |
| 5,792,350 A | 8/1998 | Sorley et al. |
| 6,251,286 B1 | 6/2001 | Gore |
| 2003/0010685 A1 | 1/2003 | Michel, Jr. |
| 2005/0260037 A1 | 11/2005 | Nilsen |
| 2006/0138060 A1 | 6/2006 | Salmi et al. |
| 2006/0201867 A1 | 9/2006 | Garcia |

\* cited by examiner

*Primary Examiner* — Nam Nguyen
*Assistant Examiner* — Claire Norris
(74) *Attorney, Agent, or Firm* — Joseph T Regard, Ltd plc

(57) ABSTRACT

An oil skimmer system on a marine vessel. The preferred embodiment contemplates a pickup wing pivotally mounted between two hulls in the forward section of the marine vessel, which is formed to collect and direct the oil to the pickup wing. The pickup wing is dynamically repositionable, the pickup wing mount having provided a mechanism for vertically positioning the unit in real time such that the front of the pickup wing is situated just below the water surface, to provide maximum collection of contaminants (in this case, hydrocarbons) floating thereupon. In the preferred embodiment of the invention, the pickup wing has a "teardrop" cross sectional profile, and is configured such that fluid motion over the its forward section, either from vessel motion or fluid current, provides a skimming action, so as to urge the surface contaminants over the wing and into a recovery area, where it is separated from the water and pumped into a collection tank.

12 Claims, 13 Drawing Sheets

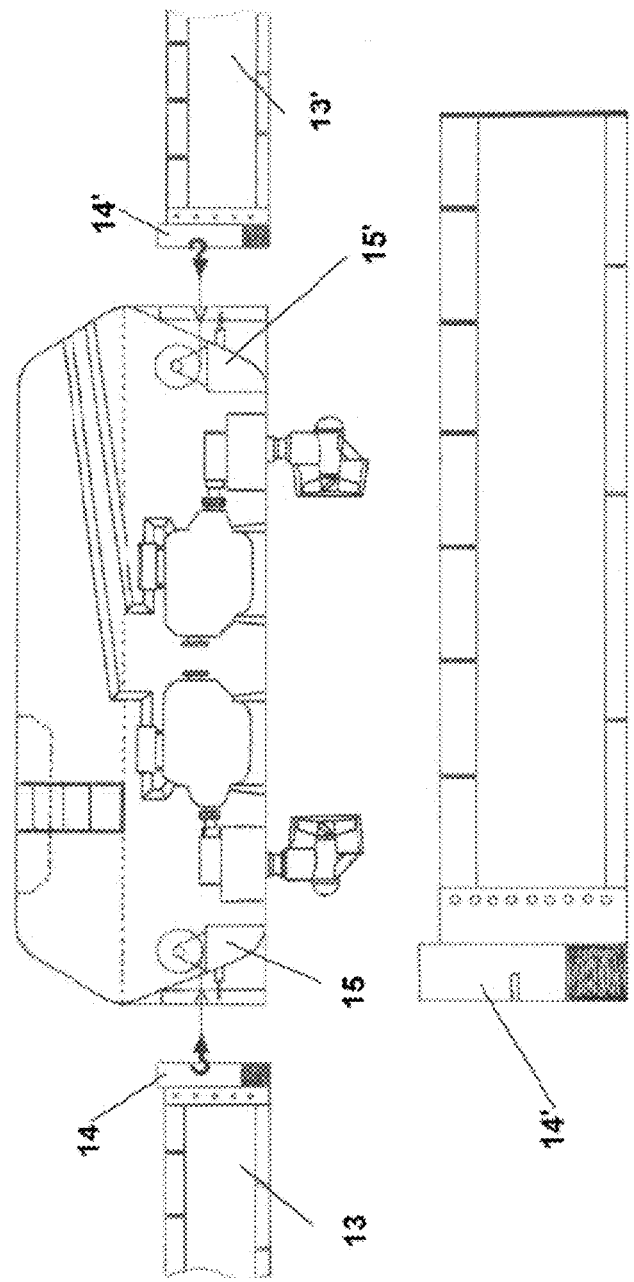

FIG 10A
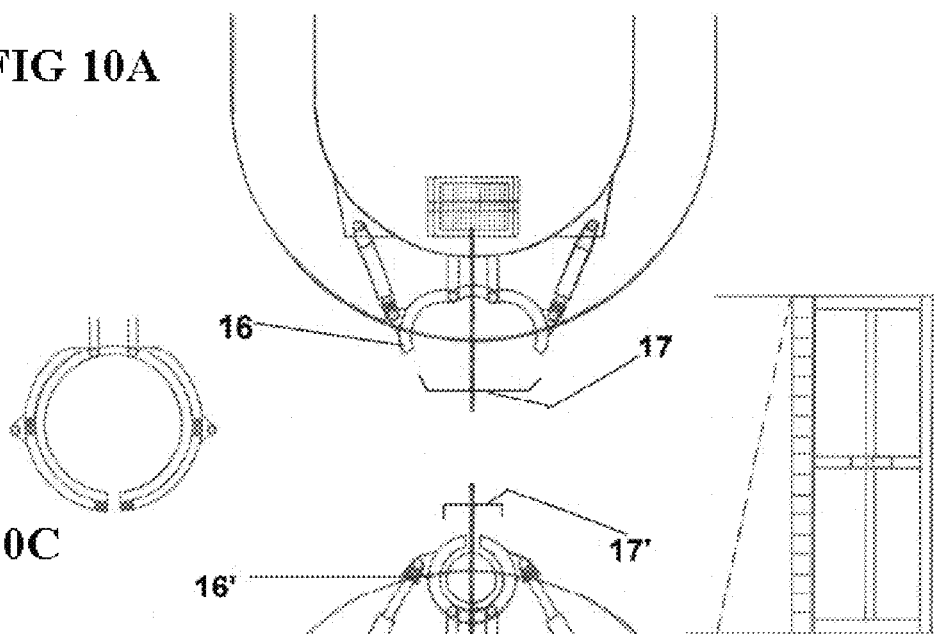
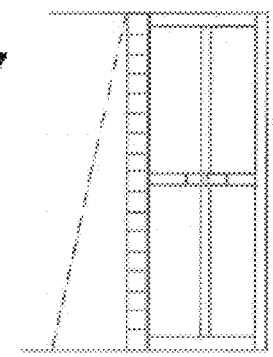
FIG 10C
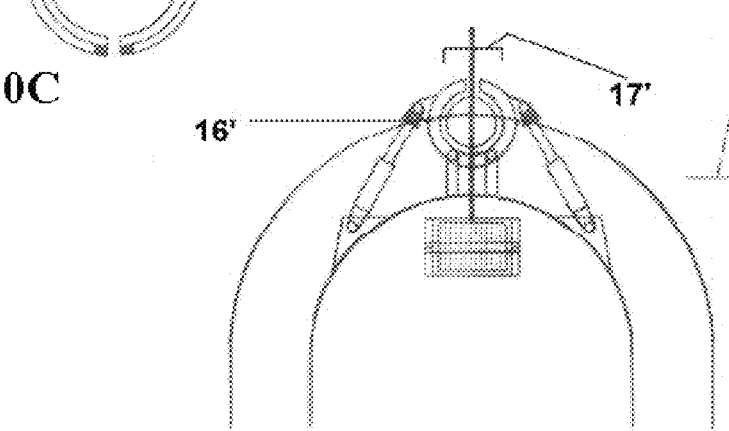
FIG 10D
FIG 10B

OIL SPILL RECOVERY VESSEL AND METHOD THEREFORE

PRIORITY CLAIM

The present application claims the benefit of U.S. Provisional Patent Application Ser. No. 61/241,992 filed Sep. 14, 2009 listing as inventor Leslie Lombas and entitled "Oil Spill Recovery Vessel and Method Therefore", the contents of which are incorporated herein by reference thereto.

GENERAL DISCUSSION OF THE INVENTION

The present invention relates to apparatus for recovery of surface contaminants, such as liquid hydrocarbons or the like, floating upon a body of water, and in particular to an oil spill recovery vessel and method of use therefore.

The preferred embodiment of the invention comprises an oil skimmer system on a marine vessel comprising a pickup wing pivotally mounted between two hulls, in the forward section of said marine vessel, the forward section formed to collect and direct the oil to the pickup wing. The pickup wing is dynamically repositionable, the pickup wing mount having provided a mechanism for vertically positioning the unit in real time such that the front of the pickup wing is situated just below the water surface, to provide maximum collection of contaminants (in this case, hydrocarbons) floating thereupon.

Two swing-mounted collection booms are preferably situated on opposing sides of the forward section of the vessel, the collection booms being pivotally adjustable, and selectively deployable, to direct surface contamination to the collection area.

The pickup wing is configured such that fluid motion over the its forward section, either from vessel motion or fluid current, provides a skimming action, so as to urge the surface contaminants over the wing and into a recovery area, where it is separated from the water and pumped into a collection tank.

The present invention thereby provides:

1) a pivotally and vertically adjustable pickup wing formed to remove surface contaminants from a body of water;

2) a vessel having a forward collection area having an opening with a pickup wing therein to form a forward skimming surface, which is vertically adjustable to facilitate highly effective collection of surface contaminants with minimum collection of non-contaminated water;

3) said vessel incorporating swing booms associated with opposing front ends of the vessel, said booms being selectively positionable to direct surface contaminants on a body of water into the collection area situated therebetween;

4) said booms may include boom extensions which are able to be positioned and towed by independent, remotely controlled vessels, so as to extend the collection capabilities of the system.

GENERAL BACKGROUND OF THE INVENTION

The concept for the Environmental Protector Class Vessel is to provide the petroleum industry a technological advance in supply boat design. The new design will give the industry an economical way to address the environmental concerns that now hampers the development of oil and gas reserves along the East and West coast continental shelves and the Gulf of Mexico coast of Florida. It will also give the petroleum industry the technological and political leverage it needs to gain access to these vital areas.

The newly designed system will give the industry for the first time ever a 24/7 pollution fighting system as part of its daily operations. The new system incorporates a fully self contained and self deployable pollution boom system for large and catastrophic spills and an oil wing pickup system incorporated into the hull of the supply vessel which can handle smaller spills by itself without boom deployment.

The primary function of the Protector Class Vessel will be to provide logistical support for drilling and production operations. But in the event of a hydro carbon release, it can respond immediately and begin clean-up operations without any additional support from outside sources. The primary advantage of this system will be its unparalleled response time and ability to cover very large areas with just one vessel.

Once this vessel is built and testing is completed the petroleum industry will be able to greatly expand its oil reserve base, generate billions in revenue for itself and its shareholders. It will also generate tens of thousands of new jobs here in the U.S., lessen our dependence on foreign oil and keep American dollars out of the hands of unfriendly foreign governments, Tax revenue and royalty payments generated by the development of the East and West shelf areas will provide the federal government and the coastline states much needed revenue to maintain their current level of services to the public. Given today's economic recession, the Environmental Protector Class Vessel provides the industry with a unique opportunity to become the driving force of America's economic recovery.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 9 is a side, cross-sectional view of the boom tug of the present invention, illustrating the booms 13, 13' attached thereto along with a pollution boom adapter 14, 14', via winch systems 15, 15'.

FIG. 9A is a side view of the boom adapter 14' and corresponding boom of FIG. 9.

FIG. 10A is a top view of the pollution boom winching and locking mechanisms 16 in their open 17 position.

FIG. 10B is a top view of the pollution boom winching and locking mechanisms 16' of FIG. 10A, in their closed 17' position.

FIG. 10C is a top view of the locking mechanism of FIG. 10B.

FIG. 10D is a side view of an exemplary pollution boom of the system of FIG. 10A.

DETAILED DISCUSSION OF THE INVENTION

Figure 1:
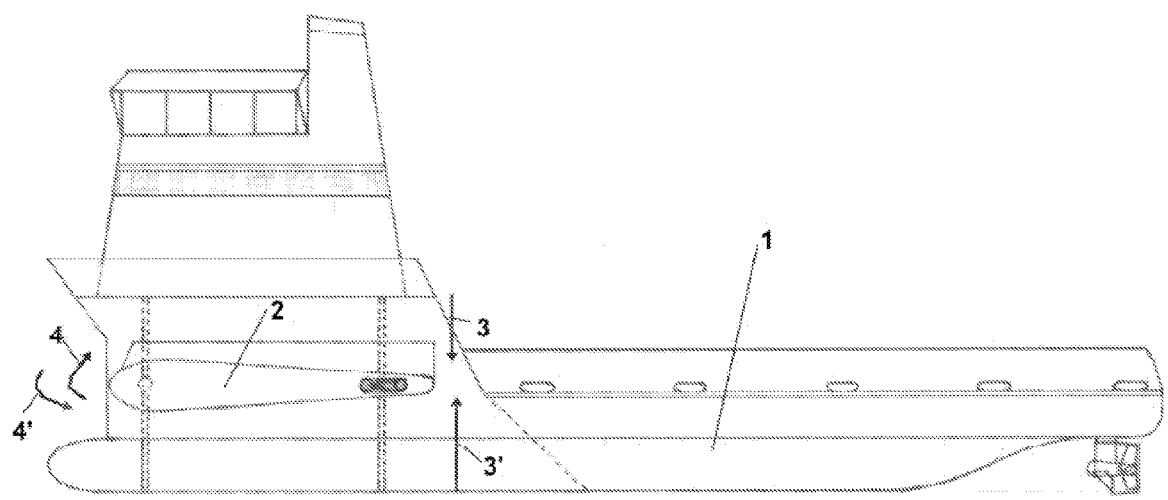
FIG. 1 is a side, partially cut-away view of the vessel 1 of the present invention, illustrating the oil pickup wing 2 and showing its vertical 3, 3' and pivotal 4, 4' positioning capabilities as may be required during operation to adjust the orientation of the wing during operations.
Figure 2:
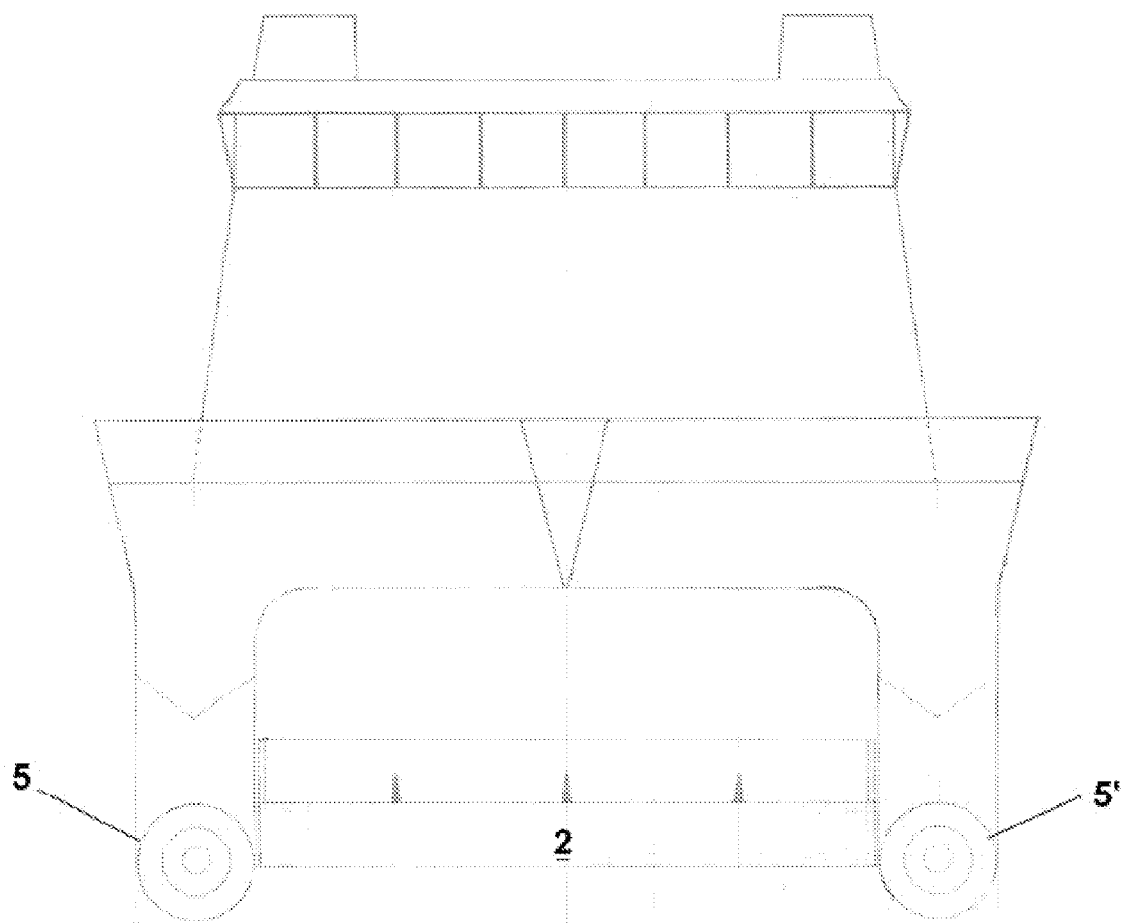
FIG. 2 is a frontal view of the vessel of FIG. 1, showing swath hull 5, 5' characteristics, and the oil pickup wing 2 lowered to an operating position.
Figure 3:
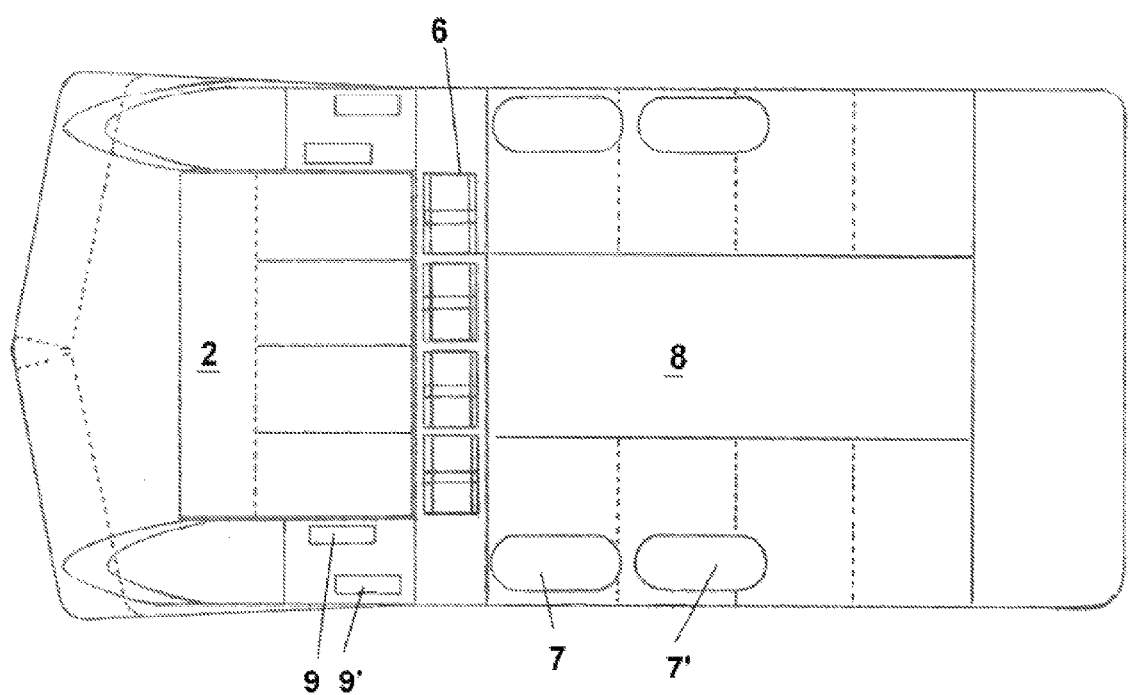
FIG. 3 is a top view of the vessel of FIG. 1, showing the deck layout of the vessel, including the boom reels 6, boom tugs 7, oil separator tank 8, oil wing pumps 9, boom tugs 10, and pick-up wing 2.
Figure 4:
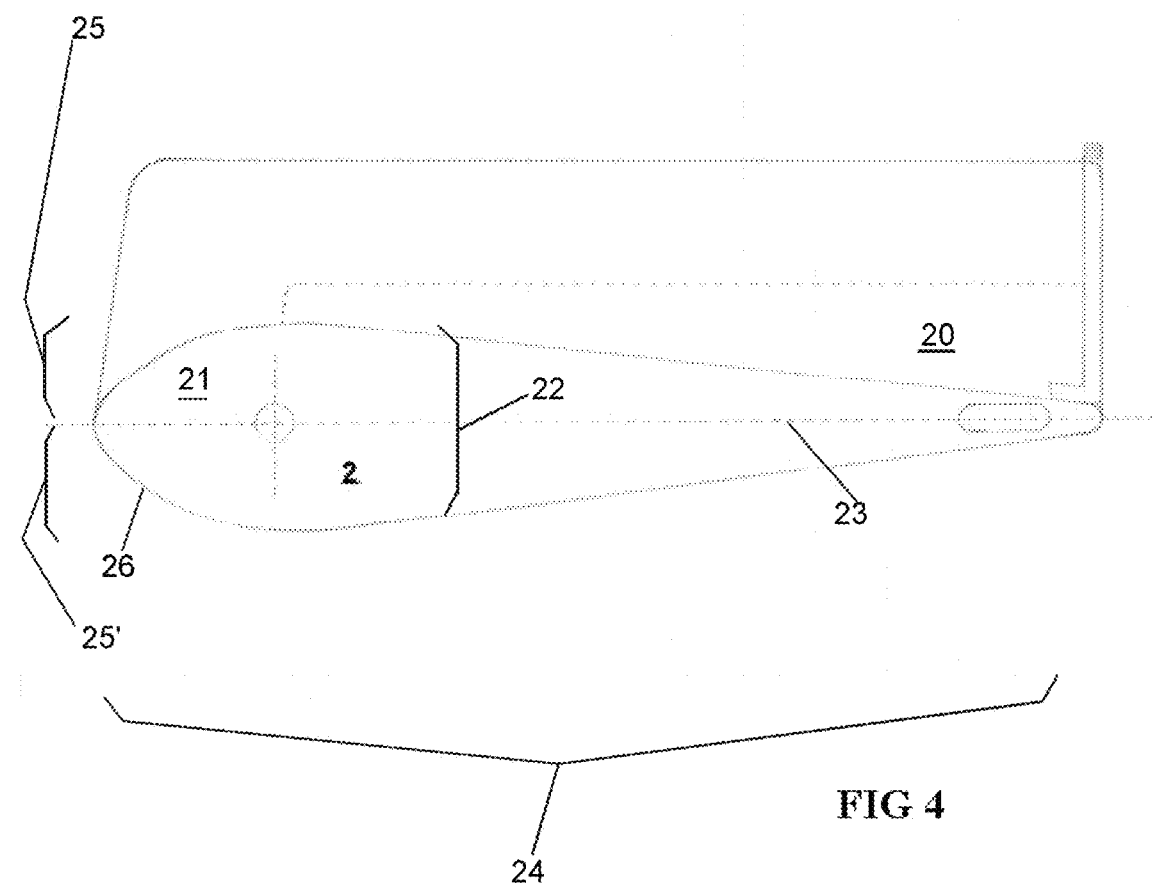
FIG. 4 is a side, cut-away view of the oil pick-up wing (lifting body) 2 of the invention of FIG. 1 having a length 24 having a longitudinal axis 23 passing centrally therethrough, an upper 25 and lower 25' surface emanating from said longitudinal axis so as to form a symmetrical, balanced configuration along opposing sides of said longitudinal axis, respectively, said pick-up wing comprising a rounded leading edge 26 forming a forward bow section 21 wherein the width 22 of the pick-up wing increases from the leading edge, thereafter tapering in a narrowing width to a form a trailing edge terminating in a sharp rear end, the tapering area of said upper surface forming a recovery area 20, said balanced configuration forming a symmetrical profile.
Figure 5:
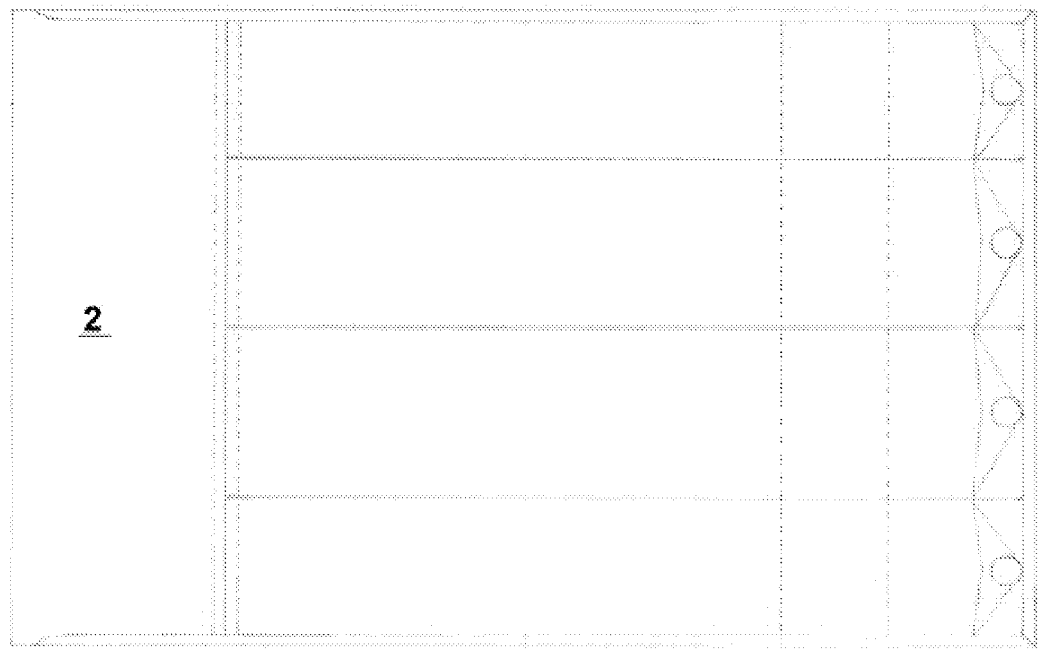
FIG. 5 is a top, close-up view of the oil pickup wing 2 of the present invention.
Figure 6:
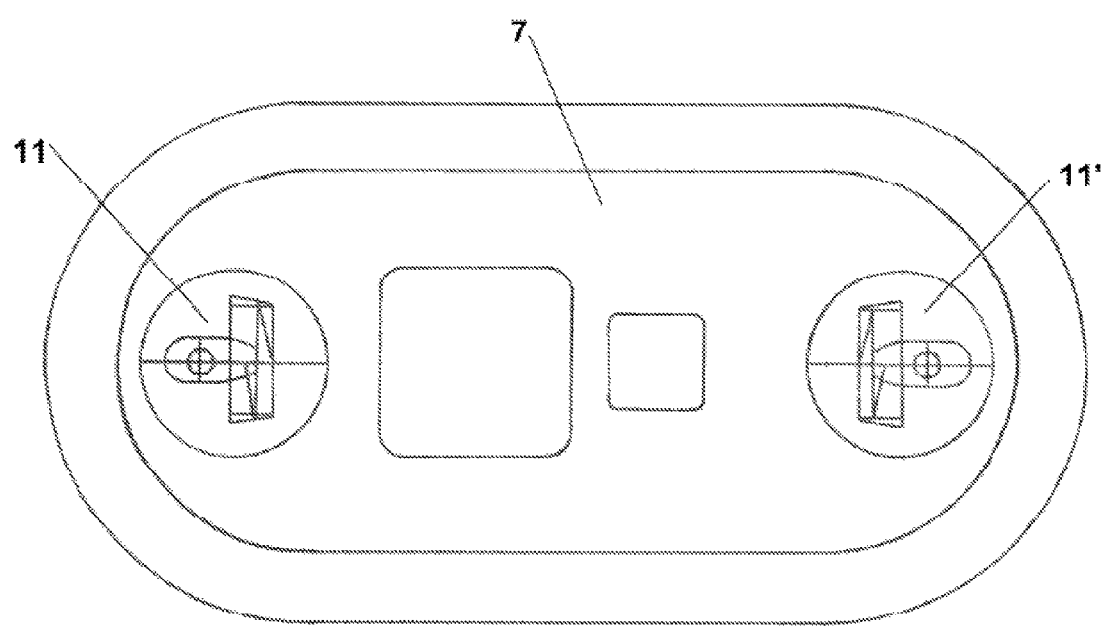
FIG. 6 is a top view of a boom tug 7 with drive units 11, 11' (Z-Drive type shown).
Figure 7:
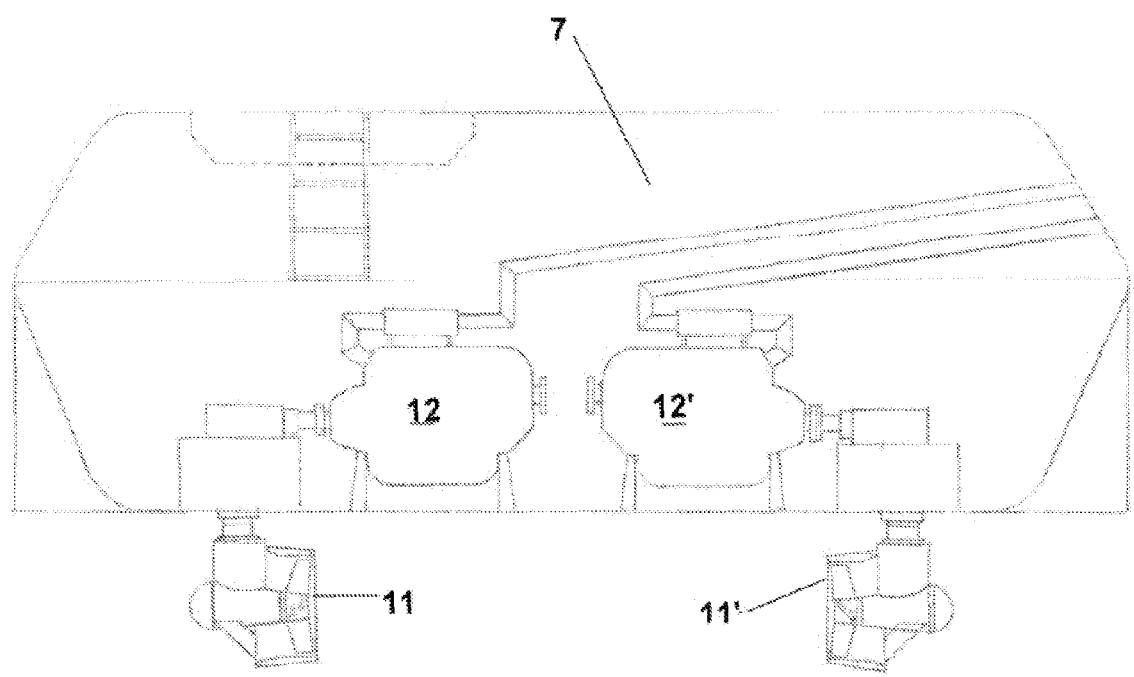
FIG. 7 is a side, cutaway view of the boom tug 7 of the present invention illustrating the engines 12, 12' and z-drive unit 11, 11' layout.
Figure 8:
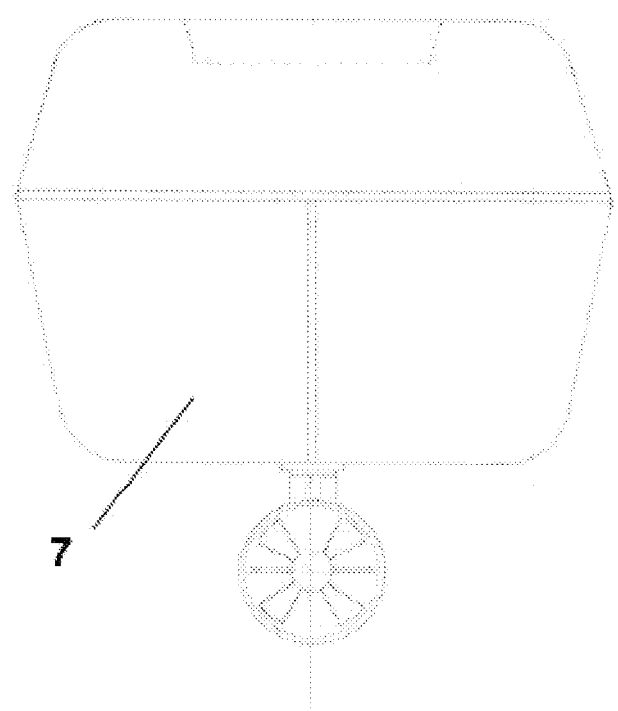
FIG. 8 is an end view of the boom tug 7 of FIG. 7.
Figure 11B:
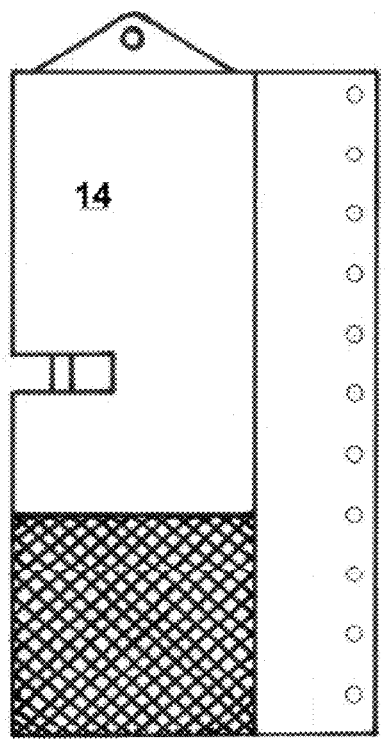
FIG. 11B is a side view of the pollution boom adapter 14 of the present invention, respectively.
Figure 11A:
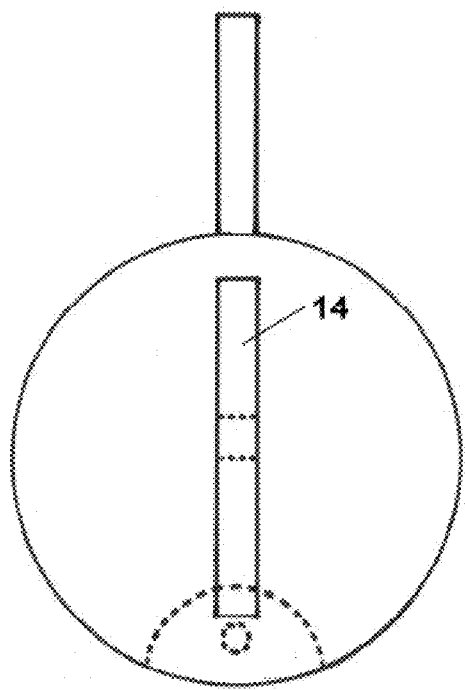
FIG. 11A is a top view of the pollution boom adapter 14 of the present invention, respectively.
Figure 12:
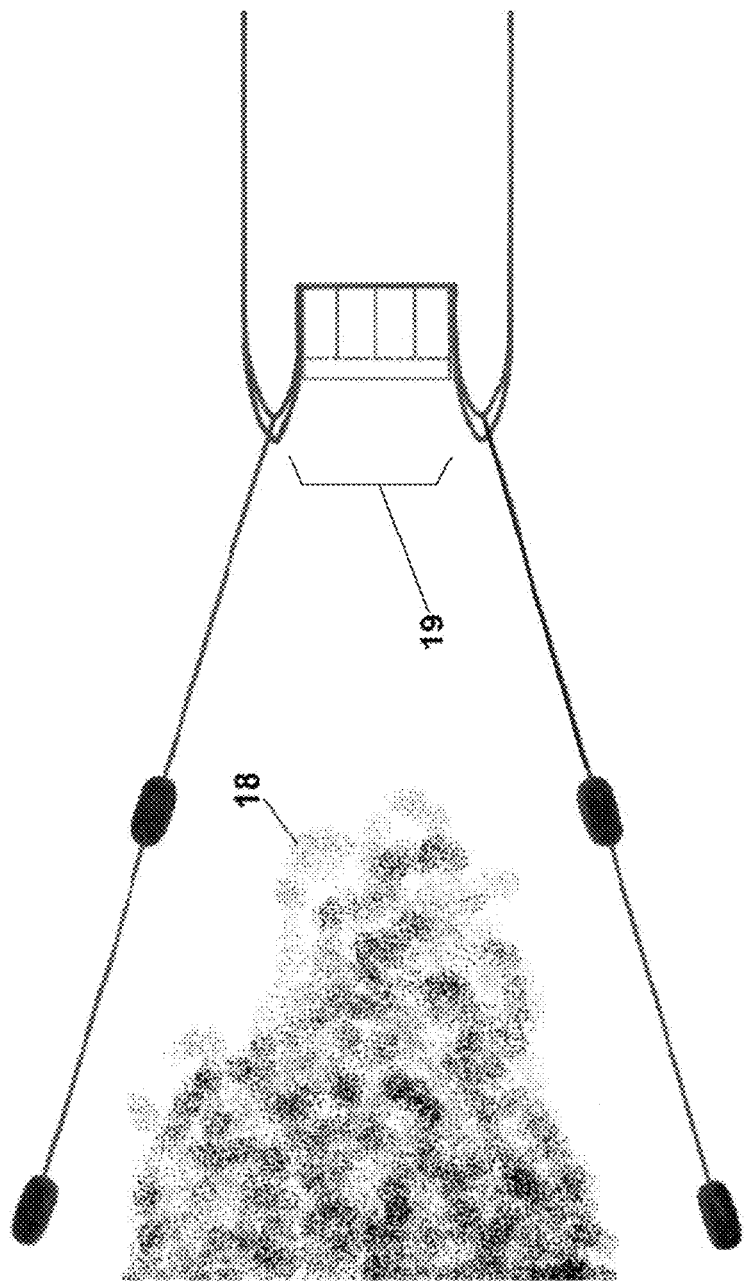
FIG. 12 is a top view of the vessel of present invention, with the pollution booms in a deployed position to direct hydrocarbons 18 to the collection area 19 of the vessel.
Figure 13:
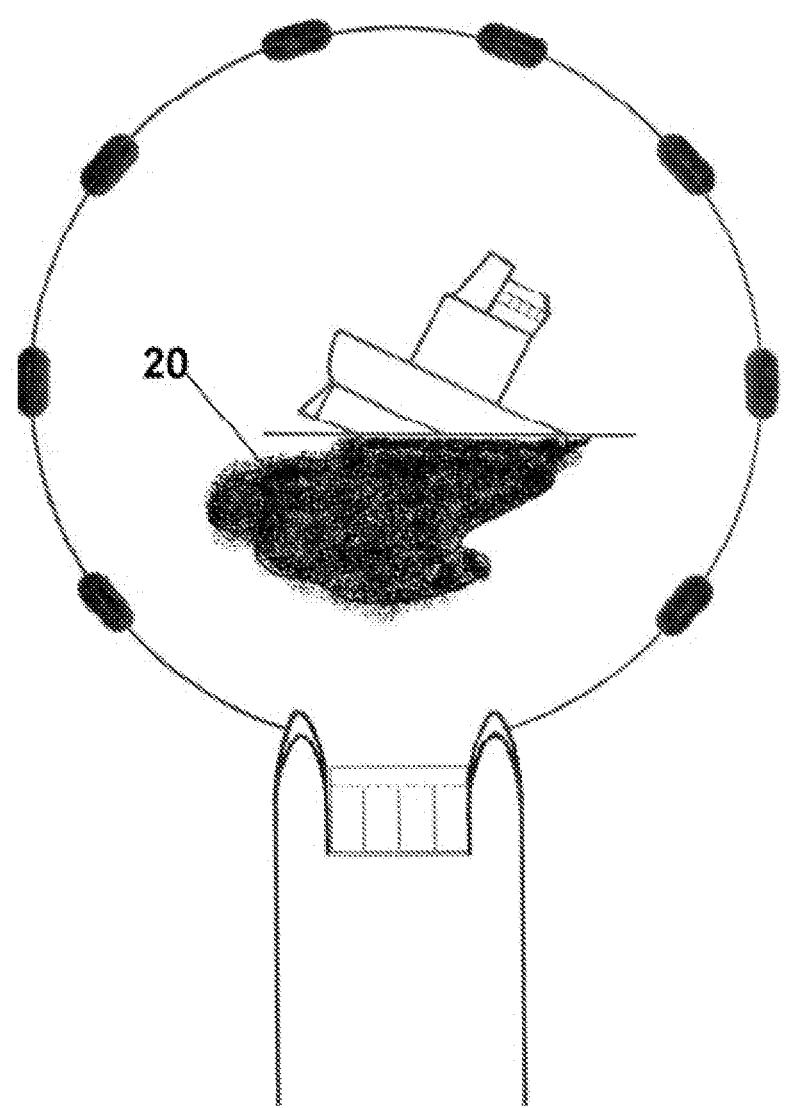
FIG. 13 is a top view of the pollution booms of the present invention, with the vessel of the present invention, containing an oil spill 20.

The Protector Class Vessel 1 uses a combination of SWATH hull technology along with the standard oil field supply vessel layout. By using SWATH in the forward section of the boat, you gain a twofold advantage crucial to the successful operation of the vessel. The first advantage is the wider beam of a SWATH hull provides the vessel with a much large oil pickup area. The second advantage is that the SWATH hulls are much more stable in rough sea conditions.

Both of these characteristics are crucial in the way the system operates. The oil pick-up wing will be housed in the forward section of the hull between the two SWATH hull sections. The wing 2 will be mounted to two vertical track sections, giving the wing the ability to move up and down and adjust to changing sea conditions.

The purpose of the wing is to create a pressure wave in front of the vessel as it moves forward thru the water. In actual operation, the wing is lowered to just below the surface of the water. The vessel moves forward and as speed increases the water pressure increases on the surface of water in front of the wing. Any wave action entering the pressure wave created by the wing is dissipated creating a smooth level surface in front of the wing.

As pressure builds a thin layer of water begins to flow over the top of the wing. In an area with oil in the surface of the water, this is exactly what you would need to carry oil into the oil pickup area of the wing. By using the wing in this manner you can minimize the amount of water taken in while maximizing the amount of oil collected. The level of the wing will be controlled by a computerized leveling system which will be able to adjust the wing to the forward speed of the vessel and the up and down pitching of the hull due to wave action, keeping the wing at its optimal operating height.

The concept of the wing creating a pressure wave can be seen best by watching a nuclear sub run on the surface and observe what happens to the wave action as it enters the pressure wave created as the sub's hull moves through the water.

The oil pick up wing is divided into four sections, with each section having its own pump. The oil water mixture is then pumped from the wing to a separator system located in the middle of the hull. Oil that is recovered through this system is then pumped into storage tanks in the vessel and the water is then pumped back over board.

The primary use of the wing being used in this manner is for small, nuisance spills, usually caused by upsets in production equipment. As drilling and production operations get closer to the shoreline and into more environmentally sensitive areas, the ability to respond and clean up these types of spills become a necessity. One small spill coming ashore on beaches in high tourists area's or bird sanctuaries can have a costly impact through fines and litigation and close the door to future access of hydro carbon reserves.

By taking advantage of the vessel wide beam and high pickup speed the spills of this size can be picked up by just running back and forth thru the affected area. After cleanup is complete the wing is then picked up and stored up the superstructure of the vessel and the vessel returns to its original job task.

Boom Tug Design

The Boom Tug carried by the PCV is an oval shape craft similar in shape and size of many survival crafts located on many structures in the offshore oil industry today. The proposed craft's twin z-drive configuration is designed to tow and control the angle of the boom string that will be attached to the PCV.

The z-drives 360 degree thrust capability gives the boom tug the ability to maneuver the boom string in any direction even when the tug is part of the boom string. The ability of the tug to control the angle of the boom string creates a much larger and effective clean up area for the PCV. The ROV and G.P.S. capabilities that will be incorporated into the tug design are two-fold.

The ROV feature is to relieve the operators from having to spend long hours in rough sea conditions on a small craft. The G.P.S. capability will ensure that the pollution booms will remain in a configuration that will maintain containment around any spill source.

Each Environmental Protector Class Vessel carries a fully equipped self deployable pollution fighting system capable of containing, and cleaning up very large pollution spills without having to wait for outside help. This is crucial to the successful clean-up of any spill site. The sooner a spill site can be contained the smaller the spill recovery site will be because the volume of oil spilled will have less time to spread due to wind, wave and currents in the area.

Four Boom Tugs will be carried on each vessel with two on each side just aft of the superstructure. The boom tugs will be approximately 25-35 ft in length and have two Z-drive units fore and aft. The proposed craft will have manual and ROV (Remotely Operated Vehicle) control systems along with G.P.S. capabilities.

The purpose of the Z-drive units is to give the vessel's maximum maneuvering capability while attached to the pollution boom string. The ability of each tug to move in any direction will give the operators control of the angle of the boom string in relation to the bow of the boat. By being able to control the boom string in this manner the operators can expand the pickup area as needed and also adjust to changing. conditions. After boom tugs are launched, operators on board will maneuver each vessel to the side of the PCV (Protector Class Vessel).

Pollution booms will then be played out from the reels and the boom adapters will be installed on the end of the pollution boom. A cable from the boom tug will then be attached to the boom adapter and winched into a locking mechanism located on both ends of the boom tug. The boom tug will then begin to tow the boom string forward towards the bow of the PCV. A smaller vessel launched from the PCV will then tow the boom string forward at and approx angle of 45 degrees off the bow of the PCV. Once in position the operators of the boom tug can turn over control of the Tug to the bridge of the PCV by engaging the ROV and G.P.S. controls and return to the PCV. The length of the boom string can be increased by launching the second Boom Tug and deploying more pollution boom from the PCV. The boom string can even be lengthened by incorporating the boom and boom tugs from other PCV type vessels responding to the spill.

Other Uses for the Environmental Protector Class Vessel

Use for the EPCV will be of great interest to the global shipping industry, especially to the operators of oil tankers. Two or three EPCV's responding to a tanker grounding or sinking could effectively contain the affected area and prevent the catastrophic environmental damage that occurs when these events take place. Modified versions of the EPCV equipped with firefighting equipment would make excellent harbor patrol craft. Also due to the nature of its design, it would be extremely effective on spills in the river systems of the U.S. One vessel can effectively cover the entire width of almost any river in the country.

EPCV type vessels can also provide base of operations for Homeland Security in the event of natural disasters or terrorists attack. With its extremely wide deck area, there should be ample room for helicopter operations if needed. In the event of a natural disaster, living quarters in modified container buildings can be stacked on the back deck providing a mobile base for emergency and relief workers.

Protector Class Type Wing Vs. Airfoil Type Shape

The shape chosen for the EPCV wing has a balanced teardrop shape (with the forward portion being the radial end of the teardrop shape and the rear portion being the tapered end) versus a true airfoil lifting wing found on other patent applications. The proposed wing for the EPCV will probably be between 60 to 80 feet in width and possibly the same dimension in length. Ideally the operating speed while the wing is in use would be between 7-10 knots. With the wing in its level operating position the teardrop shape will not cause any lift. The teardrop shape should provide a good balance forward movement through the water without causing any stability problems.

On the other hand, if a true airfoil shape were passed through water at the operating speed for the EPCV, tremendous lifting forces will occur, causing stress on the wing and hull, and affecting steering and causing possible damage to the wing leveling equipment. The lifting effect caused by a true airfoil-type wing makes this shape impractical for use on the EPCV.

CONCLUSION

The Environmental Protector Class Vessel of the present invention gives the petroleum and shipping industries a much needed tool to expand its operations. The basic design is highly adaptable to other job scopes while maintaining its original purpose of providing logical support and protection from Hydro-Carbon releases. A successful development of this concept will have a positive influence on oil and gas exploration here and around the world.

Had this technology been available when the EXXON VALDEZ ran aground, Four or five of EPCV's may have been able to contain and clean up the entire spill site before it got out of hand and became the environmental disaster that basically shut the door to oil and gas development on both coasts. The present invention now provides a system that can alleviate these concerns and the technological and political advantage that this vessel provides should be used to create jobs and provide the country with a much more secure oil supply.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

I claim:

1. A skimmer for removing contaminants from a water surface, comprising:
    a pickup wing being pivotally engaged to a marine vessel so as to allow dynamic, real time positioning so as to maintain said front of said pickup wing at the water surface to facilitate collection of contaminants floating thereupon, said pickup wing comprising length having a longitudinal axis situated centrally therethrough, and upper and lower surfaces emanating from opposing sides of said longitudinal axis, said upper and lower surfaces forming a balanced, symmetrical profile, said pick-up wing further comprising a rounded leading edge forming a forward bow section having uniformly increasing width from the leading edge, thereafter tapering in a narrowing width forming a trailing edge terminating in a sharp rear end, the tapering area of said upper surface forming a recovery area;
    whereby, upon said leading edge of said pickup engaging the water surface while traversing same, said symmetrical profile of said pickup wing in its level operating position facilitates skimming of said water surface, while minimizing lift associated therewith.

2. The skimmer of claim 1, wherein said marine vessel has a forward section, and said marine vessel comprises first and second hulls with said pickup wing mounted therebetween.

3. The skimmer of claim 2, wherein there are further provided first and second swing-mounted collection booms situated at said first and second hulls, respectively, each of said first and second collection booms being pivotally adjustable and selectively deployable so as to direct surface contamination to form a collection area between said collection booms.

4. The skimmer of claim 3, wherein said first and second hulls have a forward section, and said first and second collection booms are mounted to said forward section of said first and second hulls, respectively.

5. The skimmer of claim 1, wherein said recovery area is configured to to receive and hold fluids collected by said pickup wing.

6. The skimmer of claim 5, wherein there is further provided a collection tank, and there is further provided a pump for pumping said fluids in said recovery area to said collection tank.

7. The method of removing contaminants from a water surface, comprising the steps of:
    a. providing a pickup wing having a front forming a leading edge, a length having a longitudinal axis situated centrally therethrough, and an upper and lower surface forming a symmetrical profile, providing a balanced design along opposing sides of said longitudinal axis, respectively, said leading edge being rounded to form a forward bow section having increasing width, then tapering in a narrowing width to form a trailing edge terminating in a sharp rear end, with the tapering area of said upper surface forming a recovery area;

b. dynamically positioning said pickup wing in real time so as to maintain said leading edge of said pickup wing in contact with and in a level position relative to the water surface, while traversing said water surface, facilitating collection of contaminants floating thereupon by allowing said contaminants to flow over said leading edge and bow of said wing, and to said recovery area; while c. utilizing said symmetrical profile of said pickup wing to uniformly engage the water surface on said opposing upper and lower surfaces of said wing in balanced fashion to minimize lift and thereby enhance stability of the vessel as it traverses the water.

8. The method of claim 7 wherein in step "c" there is further provided the step "c1" utilizing said symmetrical profile of said pickup wing to minimized lifting forces which might be otherwise generated from engaging said water surface while traversing said water surface.

9. The method of claim 8 wherein in step "b" there is further provided the additional step "B1" of traversing said water surface while orienting said radial front of said pickup wing to engage said water surface to create a pressure wave in front of said wing as it moves forward thru the water, while allowing said pressure wave to dissipate any wave action entering the pressure wave, creating a smooth level surface in front of the wing.

10. The method of claim 9, wherein, after step "B1" there is further provided the added step "B2" of orienting said pickup wing so as to allow a thin layer of water from said water surface over the top of said pickup wing, thereby skimming contaminants floating on said water over said wing and into a recovery area.

11. The method of claim 10, wherein said contaminants comprise liquid hydrocarbons.

12. The method of claim 10, wherein said pickup wing is positioned by a computerized leveling system configured to adjust said wing to compensate for forward travel and any up and down pitching due to wave action, so as to keep said pickup wing aligned so as to skim said water surface.

* * * * *